(12) United States Patent
Leatherwood et al.

(10) Patent No.: US 11,197,475 B2
(45) Date of Patent: Dec. 14, 2021

(54) SYNERGISTIC GRANULAR HERBICIDAL COMPOSITIONS

(71) Applicant: EVERRIS INTERNATIONAL B.V., Heerlen (NL)

(72) Inventors: William Roland Leatherwood, Columbus, OH (US); Ariana Cohen, Tenafly, NJ (US); Rebecca Schackow, Marysville, OH (US)

(73) Assignee: EVERRIS INTERNATIONAL B.V., Heerlen (NL)

( * ) Notice: Subject to any disclaimer, the term of this patent is extended or adjusted under 35 U.S.C. 154(b) by 0 days.

(21) Appl. No.: 15/544,276

(22) PCT Filed: Jan. 19, 2016

(86) PCT No.: PCT/US2016/013829
§ 371 (c)(1),
(2) Date: Jul. 18, 2017

(87) PCT Pub. No.: WO2016/118465
PCT Pub. Date: Jul. 28, 2016

(65) Prior Publication Data
US 2018/0007891 A1    Jan. 11, 2018

Related U.S. Application Data

(60) Provisional application No. 62/105,633, filed on Jan. 20, 2015.

(51) Int. Cl.
| | | |
|---|---|---|
| *A01N 25/12* | (2006.01) | |
| *A01N 33/18* | (2006.01) | |
| *A01N 25/08* | (2006.01) | |
| *A01N 25/30* | (2006.01) | |
| *A01P 13/00* | (2006.01) | |
| *A01N 43/80* | (2006.01) | |

(52) U.S. Cl.
CPC .............. *A01N 25/12* (2013.01); *A01N 25/08* (2013.01); *A01N 25/30* (2013.01); *A01N 33/18* (2013.01); *A01N 43/80* (2013.01); *A01P 13/00* (2021.08)

(58) Field of Classification Search
CPC ........ A01N 25/12; A01N 43/80; A01N 33/18; A01N 25/08; A01N 25/30; A01P 13/00
See application file for complete search history.

(56) References Cited

U.S. PATENT DOCUMENTS

| | | | |
|---|---|---|---|
| 4,501,608 A | 2/1985 | Cannon | |
| 4,636,243 A * | 1/1987 | Burow, Jr. ............. | A01N 43/50 504/271 |
| 5,750,130 A * | 5/1998 | Ferrell ................... | A01N 25/26 424/409 |
| 6,458,745 B1 | 10/2002 | Runge et al. | |
| 6,602,823 B1 | 8/2003 | Röchling et al. | |
| 2007/0081947 A1 | 4/2007 | Eble et al. | |
| 2007/0196413 A1 | 8/2007 | Stern et al. | |
| 2010/0322990 A1 | 12/2010 | Burke et al. | |
| 2011/0118119 A1 | 5/2011 | Spesard et al. | |
| 2012/0040830 A1 | 2/2012 | Zhu et al. | |
| 2013/0023414 A1 * | 1/2013 | Dave ..................... | A01N 25/12 504/103 |
| 2014/0256551 A1 | 9/2014 | Schulz | |
| 2014/0378308 A1 * | 12/2014 | Perry .................... | A01N 43/54 504/313 |

FOREIGN PATENT DOCUMENTS

| | | |
|---|---|---|
| JP | H07233013 A | 9/1995 |
| WO | 2014093522 A1 | 6/2014 |

OTHER PUBLICATIONS

Snapshot 2.5TG Specimen Label, [online], Dow AgroSciences, 2012 [retrieved on Mar. 17, 2018], Retrieved from the Internet:<URL: http://www.cdms.net/LDat/ld0B6010.pdf> 9 pages. (Year: 2012).*
Snapshot 2.5TG Material Safety Data Sheet, [online], Dow AgroSciences, 2002 [retrieved on Mar. 17, 2018], Retrieved from the Internet:<URL:http://fs1.agrian.com/pdfs/Snapshot_2.5_TG_MSDS2.pdf> 4 pages. (Year: 2002).*
International Search Report for PCT/US2016/013829 dated Mar. 25, 2016.
International Preliminary Report on Patentability for PCT/US2016/013829 dated Jul. 25, 2017.

* cited by examiner

*Primary Examiner* — Sue X Liu
*Assistant Examiner* — Andriae M Holt
(74) *Attorney, Agent, or Firm* — David P. Owen; Hoyng Rokh Monegier B.V.

(57) ABSTRACT

Granular compositions comprising at least one herbicide that inhibits microtubule assembly, at least one herbicide that inhibits cell wall synthesis, and a surfactant, and methods for making and using such compositions, are generally described.

6 Claims, No Drawings

SYNERGISTIC GRANULAR HERBICIDAL COMPOSITIONS

CROSS REFERENCE TO RELATED APPLICATIONS

This application is a 371 national phase of PCT application number PCT/US2016/013829 filed on 19 Jan. 2016, which claims priority from U.S. application No. 62/105,633 filed on 20 Jan. 2015. Both applications are hereby incorporated by reference in their entireties.

FIELD OF INVENTION

The invention relates generally to granular compositions including a combination of herbicides comprising at least one herbicide that inhibits microtubule assembly, at least one herbicide that inhibits cell wall (i.e., cellulose) synthesis, and a surfactant are described herein Methods of using and making such granular compositions are also described.

BACKGROUND OF INVENTION

Liquid formulations comprising two herbicides are available to consumers. These formulations are generally effective at controlling weeds, but require high concentrations of active ingredients for acceptable levels of herbicidal control. For example, GEMINI® is a liquid pre-emergent formulation comprising 23.3% prodiamine and 15.5% isoxaben. GEMINI® provides a broad-spectrum pre-emergent control or suppression of more than 125 broadleaf and annual grasses.

For consumer and professional use, regulations specify the amount of a particular active ingredient that may be applied, in pounds per acre, per year. For example, the regulatory rate in the United States for prodiamine and isoxaben is 1.5 lbs/acre/year and 1.0 lbs/acre/year, respectively.

SUMMARY OF EMBODIMENTS OF THE INVENTION

Granular compositions comprising at least two herbicides and a surfactant are provided, as well as making and using such compositions, and fields comprising such compositions. The granular compositions described herein contain significantly less active ingredient than existing liquid formulations and thus are advantageous for the consumer and environment.

In some embodiments, a composition comprises at least one herbicide that inhibits microtubule assembly, at least one herbicide that inhibits cell wall synthesis, and a surfactant.

In some embodiments, a composition provides enhanced and/or synergistic herbicidal activity against a broad spectrum of weeds.

In some embodiments, a composition, when applied to a field comprising a plant or crop, results in lower phytotoxicity due to the lower use of actives than previous formulations (e.g., liquid formulations).

In some embodiments, a method is provided for making and using a composition comprising at least one herbicide that inhibits microtubule assembly, at least one herbicide that inhibits cell wall synthesis, and a surfactant.

In some embodiments, a method is provided for treating and/or preventing weeds, the method comprising applying any of the compositions described herein to soil and/or a field. In some embodiments, the method is for treating a field comprising applying one or more of the compositions described herein. As used herein, the term "treating weeds" means applying a composition to an area that contains weeds post-germination to control, suppress, or eradicate the weeds. As used herein, the term "preventing weeds" means applying a composition to an area pre-germination of weeds to prevent the germination of the weeds.

In some embodiments, a field is provided that comprises one or more of the compositions described herein.

DETAILED DESCRIPTION OF PREFERRED EMBODIMENTS OF THE INVENTION

Compositions comprising at least one herbicide that inhibits microtubule assembly, at least one herbicide that inhibits cell wall synthesis, and a surfactant are provided.

The compositions described herein provide a surprising amount of herbicidal activity and a low phytotoxicity, with a low active ingredient concentration. In some embodiments, the compositions have equal or greater herbicidal control when compared to existing formulations, with a reduced amount of active ingredient as compared to the existing formulations. In some embodiments, the compositions have a reduced amount of active ingredient of a formulation, while maintaining the herbicidal control of that formulation. In some embodiments, the compositions have a reduced amount of active ingredient of a formulation, while having greater herbicidal control than that formulation. In some embodiments, the formulations provide for equal or better efficacy as compared to a composition which provides the highest regulatory dosage allowed under current regulations (1.5 lbs/acre/year of prodiamine and 1.0 lbs/acre/year of isoxaben). The expression "reduced amount of active ingredient" means that the composition has one-half (50%) or less of the active ingredient of an existing formulation with the same or substantially similar ingredients. For example, the composition may have 50%, 45%, 40%, 35%, 30%, 25%, 20%, 15%, 10%, or less than 10% of the active ingredient of an existing formulation with the same or substantially similar ingredients.

A. Herbicides that Inhibit Microtubule Assembly

In some embodiments, the composition comprises at least one herbicide that inhibits microtubule assembly (e.g., an herbicide that is in WSSA Group 3). Examples of such herbicides include prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, butamiphos, and mixtures thereof.

In some embodiments, the composition comprises an herbicide that inhibits microtubule assembly in an amount of between about 0.1 to about 0.45 percent (%) by weight of the composition or between about 0.178 to about 0.450 percent (%) by weight of the composition. In some embodiments, the composition comprises at least one of prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, or butamiphos in an amount of between about 0.1 to about 0.45 percent (%) by weight of the composition. In some embodiments, the composition comprises at least one of prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, or butamiphos in an amount of between about 0.178 to about 0.450 percent (%) by weight of the composition.

In some embodiments, the composition comprises an herbicide that inhibits microtubule assembly in an amount of about 0.1, 0.15, 0.168, 0.178, 0.2, 0.248, 0.25, 0.3, 0.335, 0.35, 0.355, 0.375, 0.4, or 0.45 percent (%) by weight of the composition. In some embodiments, the composition comprises at least one of prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, or butamiphos in an amount of about 0.1, 0.15, 0.168, 0.178, 0.2, 0.248, 0.25, 0.3, 0.335, 0.35, 0.355, 0.375, 0.4, or 0.45 percent (%) by weight of the composition. In some embodiments, the composition comprises prodiamine in the amount of about 0.178 to about 0.450 percent (%) by weight of the composition. In other embodiments, the composition comprises prodiamine in the amount of about 0.1, 0.15, 0.168, 0.178, 0.2, 0.248, 0.25, 0.3, 0.335, 0.35, 0.355, 0.375, 0.4, or 0.45 percent (%) by weight of the composition.

B. Herbicides that Inhibit Cell Wall Synthesis

In some embodiments, the composition comprises at least one herbicide that inhibits cell wall synthesis. Examples of such herbicides include isoxaben, flupoxamen, chlorthiamid, and mixtures thereof.

In some embodiments, the composition comprises an herbicide that inhibits cell wall synthesis (e.g., those herbicides in WSSA Group 21) in the amount of between about 0.125 to about 0.375 percent (%) by weight of the composition. In some embodiments, the composition comprises at least one of isoxaben, flupoxamen, dichlobenil, or chlorthiamid in an amount of between about 0.125 to about 0.375 percent (%) by weight of the composition.

In some embodiments, the composition comprises an herbicide that inhibits cell wall synthesis in an amount of about 0.125, 0.165, 0.2, 0.25, 0.275, 0.3, 0.325, 0.335, 0.35, or 0.375 percent (%) by weight of the composition. In other embodiments, the composition comprises at least one of isoxaben, flupoxamen, dichlobenil, or chlorthiamid in an amount of about 0.125, 0.165, 0.2, 0.25, 0.275, 0.3, 0.325, 0.335, 0.35, or 0.375 percent (%) by weight of the composition. In some embodiments, the composition comprises isoxaben in an amount of between about 0.125 to about 0.375 percent (%) by weight of the composition. In other embodiments, the composition comprises isoxaben in an amount of about 0.125, 0.165, 0.2, 0.25, 0.275, 0.3, 0.325, 0.335, 0.35, or 0.375 percent (%) by weight of the composition.

C. Surfactants

In some embodiments, the composition comprises at least one herbicide that inhibits microtubule assembly, at least one herbicide that inhibits cell wall synthesis, and a surfactant. In some embodiments, the surfactant is alcohol ethoxylate, ethoxylated sorbitan ester (e.g., TWEEN® 85), caprylic/capric triglyceride, alkylpolyglucoside (e.g., a C8-10 alkylpolyglucoside), sodium dioctyl sulfosuccinate, 2-Ethyl hexanol ethylene oxide-propylene oxide ("EO-PO") nonionic surfactant, sorbitan ester, phosphate ester of polyoxyalkylated fatty alcohol, or mixtures thereof.

The composition can comprise a surfactant in the amount of between about 2.0 to about 12.0 percent (%) by weight of the composition. In some embodiments, the composition comprises a surfactant of alcohol ethoxylate, Ethoxylated Sorbitan Ester (e.g., TWEEN® 85), caprylic/capric triglyceride, alkylpolyglucoside (e.g., a C8-10 alkylpolyglucoside), sodium dioctyl sulfosuccinate, 2-Ethyl hexanol EO-PO nonionic surfactant, sorbitan ester, or phosphate ester of polyoxyalkylated fatty alcohol present in an amount of about 2.0 to about 12.0 percent (%) by weight of the composition.

In some embodiments, the composition comprises 2-ethyl hexanol EO-PO nonionic surfactant in an amount of about 2.0 to about 12.0 percent (%) by weight of the composition.

In some embodiments, the composition comprises a surfactant in the amount of about 2.0, 2.25, 2.5, 2.75, 3.0, 3.25, 3.5, 3.75, 4.0, 4.25, 4.5, 4.69, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25, 10.5, 10.75, 11.0, 11.25, 11.5, 11.75, or 12.0 percent (%) by weight of the composition. In other embodiments, the composition comprises a surfactant of alcohol ethoxylate, Ethoxylated Sorbitan Ester (e.g., TWEEN® 85), caprylic/capric triglyceride, alkylpolyglucoside (e.g., a C8-10 alkylpolyglucoside), sodium dioctyl sulfosuccinate, 2-Ethyl hexanol EO-PO nonionic surfactant, sorbitan ester, or phosphate ester of polyoxyalkylated fatty alcohol present in an amount of about 2.0, 2.25, 2.5, 2.75, 3.0, 3.25, 3.5, 3.75, 4.0, 4.25, 4.5, 4.69, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25, 10.5, 10.75, 11.0, 11.25, 11.5, 11.75, or about 12.0 percent (%) by weight of the composition. In some embodiments, the composition comprises 2-ethyl hexanol EO-PO nonionic surfactant in an amount of about 2.0, 2.25, 2.5, 2.75, 3.0, 3.25, 3.5, 3.75, 4.0, 4.25, 4.5, 4.69, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25, 10.5, 10.75, 11.0, 11.25, 11.5, 11.75, or about 12.0 percent (%) by weight of the composition.

D. Granular Compositions

In some embodiments, any of the compositions described herein can be a granular composition. The granular composition can comprise a granular carrier such as agglomerated cellulosic fibers (e.g., BIODAC®), dolomitic limestone, wood dust based chemical carriers (e.g., DG LITE™), wood fiber granules (e.g., ECOGRANULE™), crushed corn cob, crushed peanut shells, sand, and granular nitrogen, phosphorus, and/or potassium ("NPK") fertilizers. The granular composition can comprise 80 to 95% by weight of granular carrier. The granular composition can comprise about 80 percent (%) by weight, about 82 percent (%) by weight, about 84 percent (%) by weight, about 85 percent (%) by weight, about 86 percent (%) by weight, about 88 percent (%) by weight, about 90 percent (%) by weight, about 92 percent (%) by weight, about 94 percent (%) by weight, or about 95 percent (%) by weight of granular carrier.

E. Granular Compositions Comprising Herbicides and Surfactants

The composition can be a granular composition comprising at least one herbicide that inhibits microtubule assembly, at least one herbicide that inhibits cell wall synthesis, and a surfactant. In some embodiments, the composition comprises: at least one of prodiamine, benefin (benfluralin), butralin, dinitramine, ethalfiuralin, Oryzalin, Pendimethalin, trifluralin, DCPA (chlorthal-dimethyl), propyzamide (pronamide), tebutam, dithiopyr, thiazopyr, amiprophos-methyl, butamiphos, or mixtures thereof; at least one of isoxaben, flupoxamen, dichlobenil, chlorthiamid, or mixtures thereof; and a surfactant. In some embodiments, the composition comprises prodiamine, isoxaben, and a surfactant.

In some embodiments, the composition can be a granular composition comprising: at least one of prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, or butamiphos; at least one of isoxaben, flupoxamen, dichlobenil, or chlorthiamid; and alcohol ethoxylate, Ethoxylated Sorbitan Ester (e.g., TWEEN® 85), caprylic/capric triglyceride, alkylpolyglucoside (e.g., a C8-10 alkylpolyglucoside), sodium dioctyl sulfosuccinate, 2-Ethyl hexanol EO-PO nonionic surfactant, sorbitan ester, phosphate ester of polyoxyalkylated fatty alcohol, or mixtures thereof. In a preferred embodiment, the composition comprises prodiamine, isoxaben, and 2-ethyl hexanol EO-PO nonionic surfactant.

The composition can comprise: at least one of prodiamine, benefin (benfluralin), butralin, dinitramine, ethalfluralin, Oryzalin, Pendimethalin, trifluralin, DCPA (chlorthal-dimethyl), propyzamide (pronamide), tebutam, dithiopyr, thiazopyr, amiprophos-methyl, or butamiphos in an amount of about 0.1 to about 0.450 percent (%) by weight of the composition; at least one of isoxaben, flupoxamen, dichlobenil, or chlorthiamid in an amount of about 0.125 to about 0.375 percent (%) by weight of the composition; and alcohol ethoxylate, Ethoxylated Sorbitan Ester (e.g., TWEEN® 85), caprylic/capric triglyceride, alkylpolyglucoside (e.g., a C8-10 alkylpolyglucoside), sodium dioctyl sulfosuccinate, 2-Ethyl hexanol EO-PO nonionic surfactant, sorbitan ester, phosphate ester of polyoxyalkylated fatty alcohol, or mixtures thereof in an amount of about 2.0 to about 12.0 percent (%) by weight of the composition. In a preferred embodiment, the composition can be a granular composition comprising prodiamine, isoxaben, and 2-ethyl hexanol EO-PO nonionic surfactant.

In some embodiments, the composition comprises prodiamine in the amount of 0.178 to 0.450% by weight of the composition, isoxaben in an amount of about 0.125 to about 0.375 percent (%) by weight of the composition, and 2-ethyl hexanol EO-PO nonionic surfactant in an amount of about 2.0 to about 12.0 percent (%) by weight of the composition.

In some embodiments, a field comprises any of the compositions described herein.

F. Methods of Making

In some embodiments, the composition is made by combining an herbicide that inhibits microtubule assembly with a surfactant while mixing. The surfactant can be preheated to about 140° F. An herbicide that inhibits cell wall synthesis is added to the mixture of mixture of the herbicide that inhibits microtubule assembly and the surfactant to form an active ingredient mixture while maintaining temperature and mixing. A suitable solvent can be used to dissolve the active ingredients.

The active ingredient mixture is then sprayed onto the granular carrier while mixing thoroughly. In some embodiments, the composition is made by combining prodiamine, a surfactant, and isoxaben while mixing, and then the mixture is sprayed onto a granular carrier while mixing thoroughly.

In some embodiments, the composition is made by combining prodiamine, 2-ethyl hexanol EO-PO nonionic surfactant, and isoxaben while mixing, and then spraying the mixture onto a cellulosic fiber granular carrier while mixing thoroughly.

G. Methods of Using

Any of the compositions described herein can be applied to a field. As used herein, the term "field" refers to any area comprising a plant or crop, including a lawn, orchard, meadow, pasture, turf, arboretum, garden, nursery, vineyard, or the like. In some embodiments, any of the compositions described herein can be applied to a field to control, suppress, and/or prevent weeds. In another embodiment, any of the compositions described herein can be applied to a field comprising a plant or crop to control, suppress, and/or prevent weeds. The weeds can be at least one of Annual Bursage (*Ambrosia acanthicarpa*), Annual Sowthistle (*Sonchus oleraceus*), Black Medic (*Medicago lupulina*), Black Mustard (*Brassica nigra*), Black Nightshade (*Solanum nigrum*), Blackleaved Fleabane (*Conyza bonariensis*), Bracted Plaintain (*Plantago aristata*), Bristly Oxtongue (*Picris echioides*), Broadleaf Plantain (*Plantago major*), Buckhorn Plantain (*Plantago lanceolata*), Burning Nettle (*Urtica urens*), Burningbush (*Kochia scoparia*), Buttercup Oxalis (*Oxalis pes-caprae*), California Butclover (*Medicago polymorpha*), Chamberbitter (*Phyllanthus urinaria*), Canadian Horseweed (*Conyza canadensis*), Carolina Geranium (*Geranium carolinianum*), Carpetweed (*Mollugo verticillata*), Coast Fiddleneck (*Amsinckia menziesii* var. *intermedia*), Common Chickweed (*Stellaria media*), Common Groundsel (*Senecio vulgaris*), Common Lambsquarters (*Chenopodium album*), Common Mallow (*Malva neglecta*), Common Pokeweed (*Phytolacca americana*), Common Purslane (*Portulaca oleracea*), Common Ragweed (*Ambrosia artemisiifolia*), Common Vetch (*Vicia sativa*), Creeping Woodsorrel (*Oxalis corniculata*), Curly Dock (*Rumex crispus*), Dandelion (*Taraxacum officinale*), Dogfennel (*Eupatorium capillifolium*), Dwarf Fleabane (*Conyza ramosissima*), Evening Primrose (*Oenothera* spp.), False Daisy (*Eclipta prostrata*), Field Bindweed (*Convolvulus arvensis*), Field Burweed (*Soliva sessilis*), Florida Betony (*Stachys flordans*), Florida Pusley (*Richardia scabra*), Fringed Redmaids (*Calandrinia ciliata*), Green Tansymustard (*Descurainia pinnata* spp. *brachycarpa*), Hairy Bittercress (*Cardamine hirsuta*), Hairy Galinsoga (*Galinsoga quadriradiata*), Heath Aster (*Symphyotichum ericoides*), Henbit (*Lamium amplexicaule*), Honeyvine Milkweed (*Cynanchum laeve*), Hyssop Spurge (*Chamaesyce hyssopifolia*), Indian Mustard (*Brassica juncea*), Ivyleaf Morning-Glory (*Ipomoea hederacea*), Jimsonweed (*Datura stramonium*), Knotweed (*Polygonum* spp.), Ladysthumb (*Polygonum persicaria*), Lanceleaf Groundcherry (*Physalis angulata*), Little Mallow (*Malva parviflora*), Little Western Bittercress (*Cardamine oligosperma*), London Rocket (*Sisymbrium irio*), Marsh Parsley (*Cyclospermum leptophyllum*), Mousear Chickweed (*Cerastium fontanum* spp. *vulgare*), Mousear Chickweed (*Cerastium vulgatum*), Musk Thistle (*Carduus nutans*), Nettle-Leaved Goosefoot (*Chenopodium murale*), Panicle Willoweed (*Epilobium brachycarpum*), Pennsylvania Smartweed (*Polygonum pensylvanicum*), Pennywort (*Hydrocotyle* spp.), Persian Speedwell (*Veronica persica*), Petty Spurge (*Euphorbia peplus*), Pigweed (*Amaranthus* spp.), Pineappleweed (*Matricaria discoidea*), Prickly Lettuce (*Lactuca serriola*), Prickly Sida (*Sida spinosa*), Prostrate Knotweed (*Polygonum aviculare*), Prostrate Spurge (*Chamaesyce humistrata*), Purple Cudweed (*Gnaphalium purpureum*), Purslane Speedwell (*Veronica peregrina*), Rattail Fescue (*Vulpia myuros*), Redstem Filaree (*Erodium cicutarium*), Russian Thistle (*Salsola tragus*), Scarlet Pimpernel (*Anagallis arvensis*), Shepherdspurse (*Capsella bursa-pastoris*), Silversheath Knotweed (*Polygonum argyrocoleon*), Slender Plantain (*Plantago heterophylla*), Southern Waterbuttons (*Cotula australis*), Spanish needles (*Bidens alba*), Spiny Sowthistle (*Sonchus asper*), Spotted Spurge (*Chamaesyce maculata*), Stinking Chamomile (*Anthemis cotula*), Sunflower (*Helianthus* spp.), Swinecress (*Coronopus didymus*), Tall Morning-Glory (*Ipomoea purpurea*), Telegraphplant (*Heterotheca grandiflora*), Thymeleaf Speedwell (*Veronica serpyllifolia*), Turkey Mullein (*Croton setigents*), Venice Mallow (*Hibiscus trionum*), Virginia Pepperweed (*Lepidium virgiaicum*), Virginia Winged Rockcress (*Sibara virginica*), White Clover (*Trifolium repens*), White Eclipta (*Eclipta alba*), Whitestem Filaree (*Erodium moschatum*), Wild Carrot (*Daucus carota*), Wild Mustard (*Sinapis arvensis*), Wild Radish (*Raphanus raphan-* istrum), Yellow Sweetclover (*Melilotus officinalis*), Yellow Woodsorrel (*Oxalis stricta*), Annual Bluegrass (*Poa annua*), Barnyardgrass (*Echinochloa crus-galli*), Broadleaf Signalgrass (*Brachiaria platyphylla*), Browntop Panicum (*Panicum fasciculatum*), Crowfootgrass (*Dactyloctenum aegypticum*), Fall Panicum (*Panicum dichotomiflorum*), Giant Foxtail (*Setaria faberi*), Goosegrass (*Eleusine indica*), Green Foxtail (*Setaria viridis*), Itchgrass (*Rottboellia cochinchinensis*), Johnsongrass (*Sorghum halepense*), Jungle Rice (*Echinochloa colonum*), Large Crabgrass (*Digitaria sanguinalis*), Lovegrass (*Eragrostis v.*), Red Sorrell (*Rumex acetosella*), Rescuegrass (*Bromus catharticus*), Smooth Crabgrass (*Digitaria ischaemum*), Sprangletop (*Leptochloa* spp.), Texas Panicum (*Panicum texanum*), Wandering Jew (*Tradescantia zebrina*), Witchgrass (*Panicum capillare*), Woolly Cupgrass (*Eriochloa villosa*), and Yellow Foxtail (*Setaria lutescens*).

In some embodiments, the composition is applied to a field comprising sedum at least one of "Autumn Joy", Abelia 'Edward Goucher' (*Abelia grandiflora* cv. Edward Goucher), Glossy Abelia (*Abelia grandiflora*), Abelia 'Sherwood' (*Abelia grandiflora* cv. Sherwood), Balsam Fir (*Abies balsamea*), Concolor Fir (*Abies concolor*), Flat Top Acacia (*Acacia abyssinica*), Prostrate Acacia (*Acacia redolens*), Shoestring Acacia (*Acacia stenophylla*), Kiwi (*Actinidia chinensis*), Chocolate Vine (*Akebia quintata*), Mimosa, Persian Silk Tree (*Albkia julibrissin*), Lady's Leek, Nodding Onion (*Allium cernuum*), Australian Tree Fern (*Alsophils australis*), Saskatoon Serviceberry (*Amelanchier alnifolia*), Bog Rosemary (*Andromeda polifolia*), Cape Mallow (*Anisodonte hypomandarum*), Aptenia 'Red Apple' (*Aptenia cordifolia* cv. Red Apple), King Palm (*Archontophoenix cunninghamiana*), Vine Hill Manzanita (*Arctostaphlos densiflora*), Bearberry (*Arctostaphlos uva-ursi*), Cape Weed (*Arctotheca calendula*), Marlberry 'Chirimen' (*Ardisia japonica* cv. Chirimen), Argyranthemum 'Butterfly' (*Argyranthemum frutescens* cv. Butterfly), Sea Thrift 'Bloodstone' (*Armeria maritime* cv. Bloodstone), White Mugwort (*Artemesia lactiflora*), Foxtail Fern (*Asparagus densiflorus*), Ming Asparagus Fern (*Asparagus retrofractus*), Cast Iron Plant (*Aspidistra elation*), Japanese Aucuba (*Aucuba japonica*), Acuba 'Goldstrike' (*Aucuba japonica* cv. Goldstrike), Coyotebush (*Baccharis pulularis*), Red Bauhinia (*Bauhinia galpinii*), Japanese Barberry 'Crimson Pygmy' (*Berberis thunbergii* cv. Crimson Pygmy), Japanese Barberry 'Concord' (*Berberis thunbergii* cv. Concord), River Birch (*Betula nigra*), Paper Birch (*Betula papyrifera*), European White Birch (*Betula pendula*), Bidens 'Peter's Gold' (*Bidens ferulifolia* cv. Peter's Gold), Boltonia 'Snowbank' (*Boltonia asteroides* cv. Snowbank), Bougainvillea 'Barbara Karst' (*Bougainvillea x buttiana* cv. Barbara Karst), Bougainvillea 'California Gold' (*Bougainvillea x buttiana* cv. California Gold), Bougainvillea 'Pink Pixie' (*Bougainvillea x buttiana* cv. Pink Pixie), Bougainvillea 'Scarlet O'hara' (*Bougainvillea x buttiana* cv. Scarlet O'hara), Bougainvillea 'Temple Fire' (*Bougainvillea x buttiana* cv. Temple Fire), Bougainvillea 'Texas Dawn' (*Bougainvillea x buttiana* cv. Texas Dawn), Bougainvillea 'Purple Queen' (*Bougainvillea x buttiana* cv. Purple Queen), Bougainvillea 'Rosenka' (*Bougainvillea x buttiana* cv. Rosenka), Bottle Tree (*Brachychiton populneus*), Brachyscome 'New Amethyst' (*Brachyscome X* cv. New Amethyst), Black Olive (*Bucida buceras*), Japanese Boxwood (*Buxus microphylla*), Boxwood 'Green Beauty' (*Buxus macrophylla* cv. Green Beauty), Common Boxwood (*Buxus sempervirens*), Scotch Heather (*Calluna vulgaris*), Scotch Heather 'Spring Torch' (*Calluna vulgaris* cv. Spring Torch), Japanese Camellia (*Camellia japonica*), Trumpet Creeper 'Madame Galen' (*Campis x tagliabuana* cv. Madame Galen), Sedge 'Frosty Curls' (*Carex albula* cv. Frosty Curls), Hottentot Fig, Ice Plant (*Carpobrotus edulis*), Feathery Cassia (*Cassia artemisioides*), Senna (*Cassia eremophila*), Japanese Plum Yew (*Cephalotaxus harringtonia*), Carob (*Ceratonia siliqua*), Ceratostigma plumbaginoides, Chinese Plumbago (*Ceratostigma willmottianum*), Redbud (*Cercis canadensis*), Orange Flowering Quince (*Chaenomeles japonica*), Cypress 'Kosteri' (*Chamaecyparis obtusa* cv. Kosteri), Cypress 'Dwarf Hinoki' (*Chamaegparis obtusa* cv. Dwarf Hinoki), Cypress 'Torulosa (*Chamaegparis obtusa* cv. Torulosa), Cypress Fernspray' (*Chamaecyparis obtusa* cv. Fernspray), Cypress 'Slender Hinoki' (*Chamaecyparis obtusa* cv. Slender Hinoki), False Cypress (*Chamaecyparis pisifera*), False Cypress 'Squarrosa Minima' (*Chamaecyparis pisifera* cv. Squarrosa Minima), False Cypress 'Threadleaf' (*Chamaecyparis pisifera* cv. Threadleaf), False Cypress 'Sawara' (*Chamaecoaris pisifera* cv. Sawara), False Cypress 'Moss' (*Chamaecyparis pisifera* cv. Moss), Cat Palm, Meow (*Chamaedorea cataractarum*), Cluster Palm (*Chamaedorea costaricana*), Parlor Palm (*Chamaedorea elegans*), European Fan Palm, Mediterranean Fan Palm (*Chamaerops humilis*), Summersweet (*Clethra alnifolia*), Japanese Cleyera (*Cleyera japonica*), Kafir Lily (*Clivia miniata*), Breath of Heaven (*Coleonema pulchrum*), Bush Morning Glory (*Convolvulus cneorum*), Ground Morning Glory (*Convolvulus mauritanicus*), Dogwood 'Cloud Nine' (*Cornus florida* cv. Cloud Nine), Dogwood (*Cornus florida*), Kousa Dogwood (*Cornus kousa*), Smoke Tree 'Royal Purple' (*Cotinus coggygria* cv. Royal Purple), Smoke Tree 'Coral Beauty' (*Cotinus dammeri* cv. Coral Beauty), Smoke Tree 'Eichholz' (*Cotinus dammeri* cv. Eichholz), Creeping Cotoneaster (*Cotoneaster adpressus*), Cranberry Cotoneaster (*Cotoneaster apiculatus*), Box Leafed Cotoneaster (*Cotoneaster buxifolius*), Pyrenees Cotoneaster (*Cotoneaster congestus*), Bearberry Cotoneaster (*Cotoneaster dammers*), Himalayan Cotoneaster (*Cotoneaster himalayan*), Rock Cotoneaster (*Cotoneaster horizontalis*), Rockspray Cotoneaster (*Cotoneaster microphyllus*), Green Hawthorn (*Crataegus viridis*), Japanese Cryptomeria (*Cryptomeria japonica*), Carrot Wood (*Cupaniopsis anacardioides*), Mexican Heather (*Cuphea hyssopifolia*), Leyland Cypress 'Emerald Isle' (*Cupressocyparis leylandii* cv. Emerald Isle), Leyland Cypress 'Naylor's Blue' (*Cupressocyparis leylandii* cv. Naylor's Blue), Arizona Cypress (*Cupressus arizonicus*), Arizona Cypress 'Blue Pyramid' (*Cupressus arizonicus* cv. Blue Pyramid), Italian Cypress (*Cupressus sempervirens*), Italian Cypress 'Glauca' (*Cupressus sempervirens* cv. Glauca), Sago Palm (*Cycas revoluta*), Dwarf Umbrella Grass (*Cyperus albostriatus*), Holly Fern (*Cyrtomium fortunei*), Hollandia-Warminister Broom (*Cytisus praecox*), Scotch Broom (*Cytisus scoparius*), Trailing Indigo Bush (*Dalea greggii*), Rose Daphne (*Daphne cneorum*), Fragrant Daphne (*Daphne odorata*), Fortnight Lily (*Dietes vegeta*), Hopseed Bush (*Dodonaea viscosa*), Diamond Marguerite (*Dymondia margaritae*), Areca Palm (*Dypsis lutescens*), Gild Edge Elaeagnus (*Elaeagnus ebbengei*), Silverberry (*Elaeagnus pungens*), Fruitland Silver-Berry (*Elaeagnus pungens*), Red Veined Enkianthus (*Enkianthus companulatus*), Absynnian Banana (*Ensete ventricosum*), Hardy Pampasgrass (*Erianthus ravennae*), Purple Bell Heather (*Erica cinerea*), Mediterranean Pink Heather (*Erica darleyensana*), Cornish Heather (*Erica vagans*), Fleabane 'Darkest of All' (*Erigeron speciosus* cv. Darkest of All), Escallonia (*Escalonia x exoniensis*), Red Gum Eucalyptus (*Eucalyptus camaldulensis*), Silver Dollar Eucalyptus (*Eucalyptus*

*cinerea*), Coolibah Tree (*Eucalyptus microtheca*), Red ironbark Eucalyptus (*Eucalyptus sideroxylon*), Teenie Genie Brushcherry (*Eugenia myritifolia*), Dwarf Brush Cherry (*Eugenia myritifolia*), Japanese Spindle Tree 'Gold Spot' (*Euonymus japonicas* cv. Gold Spot), Japanese Spindle Tree (*Euonymus japonicus*), European Beach (*Fagus sylvatica*), Aralia Ivy (X *Fatshedera lizei*), Japanese Aralia (*Fatsia japonica*), Blue Fescue (*Festuca ovina*), Ficus Tree (*Ficus benjamina*), Forsythia (*Forsythia* x *intermedia*), Forsythia 'Spring Glory' (*Forsythia* x *intermedia* cv. Spring Glory), Weeping Forsythia (*Forsythia suspensa*), Greenstem Forsythia (*Forsythia viridissima*), Shamel Ash (*Fraxinus udhei*), Wintergreen (*Gaultheria procumbens*), Carolina jessamine (*Gelsemium sempervirens*), Woadwaxen (*Genista pilosa*), Ginko (*Ginko biloba*), Honey Locust (*Gleditsia triacanthos*), Hakonechloa 'Aureola' (*Hakonechloa macroaureolo* cv. Aureola), Common Witch Hazel (*Hamamelis virginiana*), Lilac Vine (*Hardenbergia violacea*), Boxleaf hebe (*Hebe buxifolia*), Algerian Ivy (*Hedera canariensis*), English Ivy (*Hedera helix*), Sunrose (*Helianthemum nummularium*), Licorice Plant 'White Licorice' (*Helichrysum petiolare* cv. White Licorice), Common Heliotrope (*Heliotropium fragrans*), Red Yucca (*Hesperalo parvifolia*), Rose Mallow 'Disco Bell White' (*Hibiscus moscheutos* cv. Disco Bell White), Hosta 'Francee' (*Hosta* x cv. Francee), Hosta 'Patriot' (*Hosta* x cv. Patriot), Hosta 'Albomarginata' (*Hosta lancifolia* f. albomarginata), Narrow Leafed Hosta (*Hosta lancifolia*), Hosta 'Fortunei' (*Hosta* x cv. Fortunei), Hosta (*Hosta plantaginea*), Chameleon Plant (*Houttuynia cordata*), Butte Marigold, Angelita Daisy (*Hymenoxys acaulis*), Holly 'Nellie R. Stevens' (*Ilex* x cv. Nellie R. Stevens), English Holly (*Ilex aquifolium*), English Holly 'Gold Coast' (*Ilex aquifolium* cv. Gold coast), Holly 'San Jose' (*Ilex* x *aquipernyi* cv. San Jose), Holly 'Savannah' (*Ilex* x *attenuate* cv. Savannah), Dahoon Holly (*Ilex cassine*), Chinese Holly 'Burford' (*Ilex cornuta* cv. Burford), Chinese Holly 'Needlepoint' (*Ilex cornuta* cv. Needlepoint), Chinese Holly 'Dwarf Burford' (*Ilex cornuta* cv. Dwarf Burford), Chinese Holly (*Ilex cornuta*), Japanese Holly (*Ilex crenata*), Japanese Holly 'Convexa' (*Ilex crenata* cv. Convexa), Japanese Holly 'Green Luster' (*Ilex crenata* cv. Green Luster), Japanese Holly 'Hetzii' (*Ilex crenata* cv. Hetzii), Japanese Holly 'Steeds' (*Ilex crenata* cv. Steeds), Japanese Holly 'Stokes' (*Ilex crenata* cv. Stokes), Inkberry (*Ilex glabra*), Inkberry 'Compacta' (*Ilex glabra* cv. Compacta), Meserve Holly 'Ebony Magic' (*Ilex* x *meserveae* cv. Ebony Magic), Perny's Holly (*Ilex pernyi*), Yaupon Holly (*Ilex vomitoria*), Yaupon Holly 'Nana', Dwarf Yaupon Holly (*Ilex vomitoria* cv. Nana), Yaupon Holly 'Pendula', Weeping Yaupon Holly (*Ilex vomitoria* cv. Pendula), Japanese Stare Anise (*Illicium annisatum*), Swordleaf Inula (*Inula ensifolia*), Morninging Glory 'Blue Dawn' (*Ipomea acuminate* cv. Blue Dawn), Japanese Iris 'Jodelsong' (*Iris ensata* cv. Jodelsong), Dwarf Iris (*Iris pumila*), Siberian Iris 'Cabernet' (*Iris sibirica* cv. Cabernet), Virginia Iris (*Iris virginica*), Virginia Sweetspire 'Henry's Garnet' (*Itea virginica* cv. Henry's Garnet), Scarlet Jungleflame (*Ixora coccinea*), Winter Jasmine (*Jasminum nucdiflorum*), Angel Wing Jasmine (*Jasminum nitidum*), Pink Jasmine (*Jasminum polyanthum*), Chinese Juniper (*Juniperus chinensis*), Juniper 'Old Gold' (*Juniperus chinensis* cv. Old Gold), Juniper 'Pfitzeriana Glauca' (*Juniperus chinensis* cv. Pfitzeriana Glauca), Juniper 'Sea Green' (*Juniperus chinensis* cv. Sea Green), Juniper 'Parsonii', Parsons Juniper (*Juniperus davurica* cv. Parsonii), Creeping Juniper (*Juniperus horizontalis*), Creeping Juniper 'Andorra' (*Juniperus horizontalis* cv. Andorra), Creeping Juniper 'Andorra Compacta' (*Juniperus horizontalis* cv. Andorra Compacta), Creeping Juniper 'Bar Harbor' (*Juniperus horizontalis* cv. Bar Harbor), Creeping Juniper 'Blue Chip (*Juniperus horizontalis* cv. Blue Chip), Creeping Juniper Blue Rug' (*Juniperus horizontalis* cv. Blue Rug), Creeping Juniper 'Huntington' (*Juniperus horizontalis* cv. Huntington), Japanese Garden Juniper (*Juniperus procumbens*), Savin Juniper 'Broadmoor' (*Juniperas sabina* cv. Broadmoor), Savin Juniper 'Hicksii' (*Juniperus sabina* cv. Hicksii), Savin Juniper (*Juniperus sabina*), Rocky Mountain Juniper 'Emerald Green' (*Juniperus scopulorum* cv. Emerald Green), Rocky Mountain Juniper 'Wichita Blue' (*Juniperus scopulorum* cv. Wichita Blue), Himalayan Juniper (*Juniperus squamata*), Hollywood Juniper (*Juniperus torulosa*), Eastern Redcedar (*Juniperus virginiana*), Shrimp Plant (*Justica brandegeana*), Mountain Laurel (*Kalmia latifolia*), Flamenco Red Hot Poker (*Kniphofia uvaria*), Crape Myrtle 'Burgundy Cotton' (*Lagerstromia indica* cv. Burgundy Cotton), Texas Sage (*Leucopbyllum frutescens*), Chihuahan Sage (*Leucophyllum laevigatum*), Coastal Doghobble (*Leucothoe axillaris*), Drooping Fetterbush (*Leucothoe fontanesiana*), Common Privet 'Lodense' (*Ligustrum vulgare* cv. Lodense), Amur Privet (*Ligustrum amurense*), Japanese Privet, Waxleaf Privet (*Ligustrum japonicum*), Japanese Privet 'Texanum' (*Ligustrum japonicum* cv. Texanum), Japanese Privet 'Variegatum' (*Ligustrum japonicum* cv. Variegatum), Glossy Privet (*Ligustrum lucidum*), California Privet (*Ligustrum ovalifolium*), Chinese Privet (*Limonium sinense*), Ligustrum 'Cheyenne' (*Ligustrum vulgare* cv. Cheyenne), Sea Lavender, Status (*Limonium pereizii*), American Sweetgum (*Liquidambar styraciflua*), Giant Lily Turf (*Liriope gigantea*), Liriope 'Big Blue', Lillyturf 'Big Blue' (*Liriope muscari* cv. Big Blue), Liriope 'Lilac Beauty' (*Liriope muscari* cv. Lilac Beauty), Liriope 'Majestic' (*Liriope muscari* cv. Majestic), Liriope 'Monroe White' (*Liriope muscari* cv. Monroe White), Liriope 'Silvery Sunproof' (*Liriope muscari* cv. Silvery Sunproof), Liriope 'Variegata' (*Liriope muscari* cv. Variegata), Liriope 'Silver Dragon' (*Liriope spicata* cv. Silver Dragon), Creeping *Lirope* (*Liriope spicata*), Cardinal flower, Indian Pink (*Lobelia cardinalis*), Winter Honeysuckle (*Lonicera fragrantissima*), Flowering Woodbine (*Lonicera periclymenum*), Flowering Woodbine 'Serotina' (*Lonicera periclymenum* cv. Serotina), Trumpet Honeysuckle (*Lonicera sempervirens*), Tatarian Honeysuckle (*Lonicera tatarica*), Loropetalum 'Burgundy' (*Loropetalum chinense* cv. Burgundy), Loropetalum 'Ruby' (*Loropetalum chinense* cv. Ruby), Loropetalum 'Sizzling Pink' (*Loropetalum chinense* cv. Sizzling Pink), Loropetalum 'Razzleberri' (*Loropetalum chinense* cv. Razzleberri), Moneywort (*Lysimacia mummularia*), Spotted Loosestrife (*Lysimacia punctata*), Southern Magnolia (*Magnolia grandiflora*), Saucer Magnolia (*Magnolia* x *soulangeana*), *Magnolia* 'Royal Star' (*Magnolia stellate* cv. Royal Star), Oregon Grape (*Mahonia aquafolium*), Leather Leaf *Mahonia* 'Beali' (*Mahonia japonica* cv. Beali), Creeping *Mahonia* (*Mahonia repens*), Ice Plant (*Malephora luteola*), Mandevilla 'Red Riding Hood' (*Mandevilla splendens* cv. Red Riding Hood), Ostrich Fern (*Matteuccia struthiopteris*), Banana Shrub, Port Wine Magnolia (*Michelia figo*), Maiden Grass, Eulalia (*Miscanthus sinensis*), Maiden Grass 'Silberfeder'(*Miscanthus sinensis* cv. Silberfeder), Maiden Grass 'Taku Jima' (*Miscanthus sinensis* cv. Yaku Jima), White Mulberry (*Morus alba*), Banana (*Musa acuminata*), Creeping *Myoporum* 'Putah Creek' (*Myoporum parvifolium* cv. Putah Creek), Southern Wax Myrtle (*Myrica cerifera*), Northern Bayberry (*Myrica pennylvanica*), Nandina (*Nandina domestica*), Ozark Sundrops, Evening Primrose (*Oenothera missouriensis*), Evening Primrose 'Siskiyou' (*Oenothera spe-* ciosa cv. Siskiyou), Olive* (*Oleo europaea*), Sensitive Fern (*Onoclea sensibilis*), Mondo Grass 'Nanus' (*Ophiopogon japonicas* cv. Nanus), Mondo Grass (*Ophiopogon japonicus*), Hopflower (*Onganum libanoticum*), Sweet *Osmanthus* (*Osmanthus fragrans*), Holly *Osmanthus* (*Osmanthus heterophyllus*), Holly *Osmanthus* 'Gulf Tide' (*Osmanthus heterophyllus* cv. Gulf Tide), Trailing African Daisy (*Osteospermum fruticosum*), Sourwood (*Oxydendrum arboreum*), Japanese Spurge 'Green Sheen' (*Pachysandra terminalis* cv. Green Sheen), Tree Peony (*Paeonia suffruticosa*), Penstemon 'Apple Blossom' (*Penstemon* x *gloxinoides*), Moss Phlox (*Phlox subulata*), Pygmy Date Palm (*Phoenix roebelenii*), New Zealand Flax 'Jack Spratt' (*Phormium tenax*), Common Ninebark (*Physocarpus opulifolius*), Obedient Plant 'Vivid' (*Physostegia viiginiana* cv. Vivid), Weeping Norway Spruce (*Picea abies* cv. Pendula), Spreading Norway Spruce (*Picea abies* cv. Elegans), Norway Spruce (*Picea abies*), White Spruce (*Picea glauca*), Dwarf Alberta Spruce (*Picea glauca* cv. Conica), Colorado Blue Spruce (*Picea pungens*), Hoop's Blue Spruce (*Picea pungens* cv. Hoopsii), Blue Spruce 'Kosteri' (*Picea pungens* cv. Kosteri), *Pieris*, Japanese Andromeda (*Pieris japonica*), *Pieris* 'Mountain of Fire' (*Pieris japonica* cv. Mountain of Fire), *Pieris* 'Snowdrift' (*Pieris japonica* cv. Snowdrift), *Pieris* 'Temple Bells' (*Pieris japonica* cv. Temple Bells), *Pieris* 'Valley Rose' (*Pieris japonica* cv. Valley Rose), *Pieris* 'Valley Valentine' (*Pieris japonica* cv. Valley Valentine), Mugo Pine (*Pinus mugo*), Bristlecone Pine (*Pinus aristata*), Canary Island Pine (*Pinus canariensis*), Shore Pine, Lodgepole Pine (*Pinus contorta*), Eldarica Pine (*Pinus eldarica*), Slash Pine (*Pinus elliottii*), Aleppo Pine (*Pinus halepensis*), Bosnian Pine (*Pinus leucodermis*), Black Pine (*Pinus nigra*), Longleaf Pine (*Pinus palustris*), Monterey Pine (*Pinus radiata*), Eastern White Pine (*Pinus strobus*), Scotch Pine (*Pinus sylvestris*), Scotch Pine 'Fastigiata' (*Pinus sylvestris* cv. Fastigiata), Loblolly Pine (*Pinus taeda*), Japanese Black Pine (*Pinus thunbergii*), Virginia Pine (*Pinus virginiana*), Queensland *Pittosporum* (*Pittosporum rhombifolium*), Kohuhu 'Golf Ball' (*Pittosporum tenuifolium* cv. Golf Ball), Japanese *Pittosporum* (*Pittosporum tobira*), Japanese *Pittosporum* 'Wheeler's Dwarf' (*Pittosporum tobira* cv. Wheeler's Dwarf), Sycamore (*Platanus occidentalis*), California Sycamore (*Platanus racemosa*), Plumbago (*Plumbago auriculata*), Plumbago (*Plumbago capensis*), Buddhist Pine, Yew *Podocarpus* (*Podocarpus macrophyllus*), Sweet Pea Shrub (*Polygala fruticosa*), Christmas Fern (*Po/ystichum acrostichoides*), Tassel Fern (*Polystichum polyblepharum*), Eastern Cottonwood (*Populus deltoides*), Strawberry Cinquefoil (*Potentilla fragiformis*), Shrubby Cinquefoil (*Potentilla fruticosa*), Cinquefoil 'Floppy Disc' (*Potentilla fruticosa* cv. Floppy Disc), Cinquefoil 'Gold Drop' (*Potentilla fruticosa* cv. Gold Drop), Cinquefoil 'Goldfinger' (*Potentilla fruticosa* cv. Goldfinger), Cinquefoil 'Red Ace' (*Potentilla fruticosa* cv. Red Ace), Cinquefoil 'Sunset' (*Potentilla fruticosa* cv. Sunset), Cinquefoil 'Tangerine' (*Potentilla fruticosa* cv. Tangerine), Spring Cinquefoil (*Potentilla verna*), Chilean Mesquite (*Prosopis chilensis*), Cherry Laurel, English Laurel (*Prunus laurocerasus*), Cherry Laurel 'Otto Luyken' (*Prunus laurocerasus* cv. Otto Luyken), Carolina Cherry Laurel (*Prunus caroliniana*), Carolina Cherry Laurel 'Bright 'n Tight' (*Prunus caroliniana* cv. Bright 'n Tight), Dwarf Flowering Almond (*Prunus glandulosa*), Yoshino Cherry (*Prunus* x *yedoensis*), Douglas Fir (*Pseudotsuga menziesii*), Strawberry Guava (*Psidium cattleianum*), Scarlet Firethorn (*Pyracantha coccinea*), Scarlet Firethorn 'Lalandei' (*Pyracantha coccinea* cv. Lalandei), Pyracantha, Chinese Firethorn (*Pyracantha fortuneana*), *Pyracantha* 'Monon' (*Pyracantha fortuneana* cv. Monon), *Pyracantha* 'Red Elf' (*Pyracantha fortuneana* cv. Red Elf), *Pyracantha* 'Rutgers Hybrid' (*Pyracantha fortuneana* cv. Rutgers Hybrid), *Pyracantha*, Formosa Firethorn (*Pyracantha koidzumii*), *Pyracantha* 'Victory' (*Pyracantha koidzumii* cv. Victory), *Pyracantha* 'Santa Cruz' (*Pyracantha koidzumii* cv. Santa Cruz), Bear Oak (*Quercus ilicifolia*), Pin Oak (*Quercus palustris*), Willow Oak (*Quercus phellos*), Eastern Red Oak (*Quercus rubra*), Shumard Oak (*Quercus shumardii*), Mexican Hat (*Ratibida columnifera*), Majesty Palm (*Ravenea rivularis*), Indian Hawthorn (*Rhaphiolepis indica*), Indian Hawthorn 'Charisma' (*Rhaphiolepis indica* cv. Charisma), Indian Hawthorn 'Enchantress' (*Rhaphiolepsis indica* cv. Enchantress), Indian Hawthorn 'Springtime' (*Rhaphiolepis indica* cv. Springtime), Indian Hawthorn 'Ballerina' (*Rhaphiolepis indica* cv. Ballerina), Yeddo Hawthorne (*Rhaphiolepis ovata*), Azalea 'Fashion' (*Rhododendron* x cv. Fashion), Azalea 'Wakaebisu' (*Rhododendron* x cv. Wakaebisu), Azalea 'George Tabor' (*Rhododendron* x cv. George Tabor), Azalea 'Delaware Valley White' (*Rhododendron* x cv. Delaware Valley White), Azalea 'Girard's Roberta' (*Rhododendron* x cv. Girard's Roberta), Azalea 'Girard's Crimson' (*Rhododendron* x cv. Girard's Crimson), Exbury 'Azalea Golden Flare' (*Azalea* x cv. Golden Flare), Azalea 'Helmut Vogel' (*Rhododendron* x cv. Helmut Vogel), Azalea 'Hershey Red' (*Rhododendron* x cv. Hershey Red), Azalea 'Inga' (*Rhododendron* x cv. Inga), Azalea 'Irene Koster' (*Rhododendron* x Irene Koster), Azalea 'President Clay' (*Rhododendron indicum* cv. President Clay), Azalea 'Tradition' (*Rhododendron* x Tradition), Rhododendron 'Elizabeth' (*Rhododendron forrestii* x *griersoniamum* cv. Elizabeth), Flame Azalea (*Rhododendron calendulaceum*), Klondyke Azalea (*Rhododendron calendulaceum* cv. Klondyke), Azalea 'Cannon's Double' (*Azalea* x cv. Cannon's Double), Dwarf Purple Rhododendron (*Rhododendron impeditum*), Azalea 'Blue Danube' (*Rhododendron* x *kaempferi* cv. Blue Danube), Great Laurel Rosebay *Rhododendron* (*Rhododendron maximum*), Korean *Rhododendron* (*Rhododendron mucronulatum*), Kurume Azalea (*Rhododendron obtusum*), *Rhododendron* 'Chionoides' (*Rhododendron* x *ponticum* cv. Chionoides), *Rhododendron* 'Dwarf Scarlet Wonder' (*Rhododendron* x cv. Dwarf Scarlet Wonder), *Rhododendron* 'Trilby' (*Rhododendron racemosum* cv. Trilby), *Rhododendron* 'Ramapo' (*Rhododendron* x cv. Ramapo), Azalea 'Gumpo Pink' (*Azalea* x cv. Gumpo Pink), Azalea 'Higasa' (*Azalea* x cv. Higasa), Lady Banks' Rose (*Rosa banksiae*), Leatherleaf Fern (*Rumohra adiantiformis*), Spineless Butchers Broom (*Ruscus hypophyllum*), Weeping Willow (*Salix babylonica*), Green Lavender Cotton (*Santolina virens*), Dwarf Bamboo (*Sasa pygmaea*), Skull Cap (*Scutellaria resinosa*), Coast Redwood (*Sequoia sempervirens*), Giant Sequoia (*Sequoiadendron giganteum*), Japanese skimmia (*Skimmia japonica*), Reeves *Skimmia* (*Skimmia reevesiana*), Paraguay Nightshade (*Solanum rantonnetii*), Spirea 'Anthony Waterer' (*Spiraea* x *bumalda* cv. Anthony Waterer), Spirea 'Magic Carpet' (*Spiraea japonica* cv. Magic Carpet), Spiraea 'Neon Flash' (*Spiraea japonica* cv. Neon Flash), *Spiraea* 'Shirobana' (*Spiraea japonica* cv. Shirobana), Vanhoutte *Spirea* (*Spiraea japonica* x *vanbouttes*), Marmalade Bush (*Streptosolen jamesonii*), Mahogany (*Swietenia mahogam*), Common Lilac (*Syringa vulgaris*), Magenta Cherry (*Syzygium paniculatum*), Japanese Yew (*Taxus cuspidata*), Yew (*Taxus media*), Cape Honeysuckle (*Tecomaria capensis*), Japanese Ternstroemia (*Ternstroemia gymnanthera*), Bush Germander (*Teucrium fruticans*), Yunnan Meadow Rue (*Thalictrum dipteroarpum*), Yellow Oleander (*Thevetia neriifolia*), Arborvitae, American Arborvitae (*Thuja occidentalis*), Arborvitae 'Emerald' (*Thuja occidentalis* cv. Emerald), Arborvitae 'Globe' (*Thuja occidentalis* cv. Globe), Arborvitae 'Little Giant' (*Thuja occidentalis* cv. Little Giant), Arborvitae 'Dark Green' (*Thuja occidentalis* cv. Dark Green), Arborvitae 'Pyramidal' (*Thuja occidentalis* cv. Pyramidalis), Arborvitae 'Rheingold' (*Thuja occidentalis* cv. Rheingold), Arborvitae 'Techny' (*Thuja occidentalis* cv. Techny), Woodward's Arborvitae (*Thuja occidentalis* cv. Woodwardii), Arborvitae 'Aurea Nana' (*Thuja orientalis* cv. Aurea Nana), Princess Flower (*Tibouchina urvilleana*), Asian Star Jasmine, Star Jasmine (*Trachelospermum asiaticum*), Windmill Palm (*Trachycarpus fortunei*), Canada Hemlock, Eastern Hemlock (*Tsuga canadensis*), Society Garlic (*Tulbaghia violacea*), Chinese Elm (*Ulmus parvifolia*), Koreanspice Viburnum (*Viburnum carlesii*), David Viburnum (*Viburnum davidii*), Japanese Viburnum (*Viburnum japonicum*), Wayfaring Tree (*Viburnum lantana*), Sweet Viburnum (*Viburnum odoratissimum*), Japanese Snowball (*Viburnum plicatum*), Doublefile Viburnum (*Viburnum plicatum* f. *tomentosum*), Prague Viburnum (*Viburnum* x *pragense*), Canary Island Viburnum (*Viburnum tinus* subsp. *rigidum*), Tea Viburnum (*Viburnum setigefirm*), Sandankwa viburnum (*Viburnum suspensum*), Laurustinus (*Viburnum tinus*), Laurustinus 'Spring Bouquet' (*Viburnum tinus* cv. Spring Bouquet), American Cranberrybush Viburnum (*Viburnum trilobum*), Wright's Viburnum (*Viburnum wrightii*), Bigleaf Periwinkle (*Vinca major*), Dwarf Periwinkle (*Vinca minor*), Mexican Fan Palm (*Washingtonia robusta*), Shiny Xylosma (*Xylosma senticosa*), Spanish Bayonet (*Yucca aloifolia*), Yucca Adam's Needle (*Yucca filamentosa*), and Cardboard Palm (*Zamia furfuracea*).

Any of the above described compositions can have a synergistic effect of reduced phytotoxicity as compared to a composition comprising at least about 1.5 times the amount of active ingredient. In some embodiments, the composition comprises an herbicide that inhibits microtubule assembly (e.g., an herbicide that is in WSSA Group 3), an herbicide that inhibits cell wall synthesis (e.g., those herbicides in WSSA Group 21), and a surfactant, and has a synergistic effect of reduced phytotoxicity at a time of greater than about 3, greater than about 7, greater than about 14, greater than about 21, greater than about 28, greater than about 60, or greater than about 90 days after treatment. In another embodiment, the composition comprises prodiamine, isoxaben, and a surfactant, and has a synergistic effect of reduced phytotoxicity at a time of greater than about 3, greater than about 7, greater than about 14, greater than about 21, greater than about 28, greater than about 60, or greater than about 90 days after treatment. In some embodiments, the composition comprises prodiamine, isoxaben, and 2-ethyl hexanol EO-PO nonionic surfactant, and has a synergistic effect of reduced phytotoxicity at a time of greater than about 3, greater than about 7, greater than about 14, greater than about 21, greater than about 28, greater than about 60, or greater than about 90 days after treatment. In a preferred embodiment, the composition comprises prodiamine in an amount of about 0.178 to about 0.450 percent (%) by weight of the composition, isoxaben in an amount of about 0.125 to about 0.375 percent (%) by weight of the composition, and 2-ethyl hexanol EO-PO nonionic surfactant in an amount of about 2.0 to about 12.0 percent (%) by weight of the composition, and has a synergistic effect of reduced phytotoxicity at a time of greater than about 3, greater than about 7, greater than about 14, greater than about 21, greater than about 28, greater than about 60, or greater than about 90 days after treatment.

In some embodiments, any of the compositions described herein can be applied to weeds with a synergistic herbicidal activity. In another embodiment, the composition has equal or higher herbicidal activity than a composition comprising greater the amount (e.g., about 1.5 times the amount) of agriculturally active ingredient at a time of greater than about 3, greater than about 7, greater than about 14, greater than about 21, greater than about 28, greater than about 60, or greater than about 90 days after treatment.

In some embodiments, the composition comprises prodiamine, isoxaben, and 2-ethyl hexanol EO-PO nonionic surfactant, and has a synergistic level of herbicidal activity at a time of greater than about 3, greater than about 7, greater than about 14, greater than about 21, greater than about 28, greater than about 60, or greater than about 90 days after treatment. In another embodiment, the composition comprises prodiamine in an amount of about 0.178 to about 0.450 percent (%) by weight of the composition, isoxaben in an amount of about 0.125 to about 0.375 percent (%) by weight of the composition, and 2-ethyl hexanol EO-PO nonionic surfactant in an amount of about 2.0 to about 12.0 percent (%) by weight of the composition, and has a synergistic level of herbicidal activity at a time of greater than about 3, greater than about 7, greater than about 14, greater than about 21, greater than about 28, greater than about 60, or greater than about 90 days after treatment. The composition can comprise prodiamine in an amount of about 0.178 to about 0.450 percent (%) by weight of the composition, isoxaben in an amount of about 0.125 to about 0.375 percent (%) by weight of the composition, and 2-ethyl hexanol EO-PO nonionic surfactant in an amount of about 2.0 to about 12.0 percent (%) by weight of the composition, and has an equal or greater herbicidal activity than a composition comprising a greater amount of prodiamine and/or isoxaben at a time of greater than about 3, greater than about 7, greater than about 14, greater than about 21, greater than about 28, greater than about 60, or greater than about 90 days after treatment.

Any of the compositions described herein can have the same efficacy as a composition comprising a greater amount (e.g., twice of the amount) of the active ingredients. In an embodiment, the composition comprises prodiamine in an amount of about 0.178 to about 0.450 percent (%) by weight of the composition, isoxaben in an amount of about 0.125 to about 0.375 percent (%) by weight of the composition, and 2-ethyl hexanol EO-PO nonionic surfactant in an amount of about 2.0 to about 12.0 percent (%) by weight of the composition, and has a reduced amount of active ingredient as compared to a composition comprising an amount of isoxaben and prodiamine, but the same efficacy as the comparative composition.

Any of the compositions described herein can be applied to field at an amount equivalent to about 50%, 55%, 57.5%, 60%, 62.5%, 65%, 67.5%, 70%, 72.5%, 75%, 77.5%, or about 80% of the 1.5 lbs/acre/year usage limit for prodiamine and 1.0 lbs/acre/year limit for isoxaben.

The following specific examples are presented to further illustrate certain aspects of the present invention, and are not to be construed as limiting the present invention. In the following examples, all percentages and parts are by weight unless otherwise specified.

EXAMPLES

Example 1

Several formulations were made to demonstrate how effective surfactants were at releasing the active ingredients from granular carriers. Each formulation was made with 0.65% prodiamine and 0.5% isoxaben.

TABLE 1

| No. | Surfactant | % AI Isoxaben | % AI Prodiamine | % Released Isoxaben | % Released Prodiamine |
| --- | --- | --- | --- | --- | --- |
| 1 | 5% 2-Ethyl hexanol EO-PO nonionic surfactant | 0.128 | 0.135 | 25.652 | 20.840 |
| 2 | 5% Ethoxylated Sorbitan Ester | 0.099 | 0.017 | 19.756 | 2.598 |
| 3 | 5% alcohol ethoxylate 7 mol | 0.081 | 0.067 | 17.734 | 9.210 |
| 4 | 5% alcohol ethoxylate 12 mol | 0.080 | 0.044 | 16.808 | 7.037 |
| 5 | 5% 2-Ethyl hexanol EO-PO nonionic surfactant | 0.039 | 0.113 | 22.883 | 48.584 |
| 6 | 5% $C_8$-$C_{10}$ alkylpolyglucoside | 0.036 | 0.006 | 7.144 | 0.989 |
| 7 | 2.5% alcohol ethoxylate 7 mol | 0.033 | 0.017 | 6.692 | 2.648 |
| 8 | No Surfactant | 0.023 | 0.011 | 4.587 | 1.706 |
| 9 | 5% sodium dioctyl sulfosuccinate | 0.018 | 0.010 | 3.646 | 1.533 |
| 10 | 1% alcohol ethoxylate 7 mol | 0.010 | 0.027 | 2.345 | 4.028 |
| 11 | standard in water | 0.010 | ND | 1.320 | 0.000 |

The results in Table 1 demonstrate that formulations that include 2-ethyl hexanol EO-PO proved the best in releasing maximum amount of the actives off the carrier compared to the other formulations.

Example 2

Several formulations were made to compare the herbicidal activity of compositions comprising varying amounts of isoxaben and prodiamine, as well as varying types of surfactants and amount of surfactant. Twelve formulations were prepared, with formulations 1-10 using 2-ethyl hexanol EO-PO as the surfactant, and Formulations 11-12 using alcohol ethoxylate as the surfactant.

The Formulations were tested on seven weed species, and the tests were run in at least two locations. Standard soilless nursery substrates and irrigation practices were used. The trials were designed as randomized complete block trials with five blocks and three replicates. This trial was conducted as a completely randomized design with three replicates, with an application rate of 11.2 g/m$^2$.

Compositions were made according to the Table 2:

TABLE 2

| Treatment | Isoxaben % | Prodiamine % | Surfactant | Surfactant % |
| --- | --- | --- | --- | --- |
| Formulation #1 | 0.25 | 0.355 | 2-ethyl hexanol EO-PO | 7 |
| Formulation #2 | 0.25 | 0.75 | 2-ethyl hexanol EO-PO | 2 |
| Formulation #3 | 0.5 | 0.355 | 2-ethyl hexanol EO-PO | 2 |
| Formulation #4 | 0.25 | 0.375 | 2-ethyl hexanol EO-PO | 3.5 |
| Formulation #5 | 0.25 | 0.375 | 2-ethyl hexanol EO-PO | 2 |
| Formulation #6 | 0.25 | 0.355 | 2-ethyl hexanol EO-PO | 3.5 |
| Formulation #7 | 0.335 | 0.128 | 2-ethyl hexanol EO-PO | 1.19 |
| Formulation #8 | 0.085 | 0.128 | 2-ethyl hexanol EO-PO | 4.69 |
| Formulation #9 | 0.085 | 0.503 | 2-ethyl hexanol EO-PO | 1.19 |
| Formulation #10 | 0.165 | 0.248 | 2-ethyl hexanol EO-PO | 2.31 |
| Formulation #11 | 0.5 | 0.65 | alcohol ethoxylate | 1 |
| Formulation #12 | 0.5 | 0.65 | alcohol ethoxylate | 5 |
| Untreated | — | — | — | — |

The formulations of Table 2 were applied to the weed species, and the percentage of control was measured as shown in Table 3.

TABLE 3

Percentage Control of Weed Seed Germination. Treatments and related formulation information are given on the left. Degree of control over the 90 day period is given where available. The figures represent percent control for all locations. Groundsel screening was terminated at flowering and Hairy Bittercress screening was terminated at plant senescence.

| | Formula Component % | | | Days After Treatment | | | | | | |
|---|---|---|---|---|---|---|---|---|---|---|
| Trt. | Isox. | Prod. | Surf. | 3 | 7 | 14 | 21 | 28 | 60 | 90 |
| | | | | Annual Bluegrass | | | | | | |
| 1 | 0.25 | 0.355 | 7 | 100% | 100% | 96% | 93% | 90% | 56% | 64% |
| 2 | 0.25 | 0.75 | 2 | 100% | 100% | 91% | 85% | 82% | 67% | 72% |
| 3 | 0.5 | 0.355 | 2 | 100% | 100% | 69% | 73% | 62% | 42% | 53% |
| 4 | 0.25 | 0.375 | 3.5 | 100% | 100% | 81% | 76% | 66% | 50% | 56% |
| 5 | 0.25 | 0.375 | 2 | 100% | 100% | 79% | 76% | 69% | 42% | 42% |
| 6 | 0.25 | 0.355 | 3.5 | 100% | 100% | 75% | 72% | 67% | 44% | 53% |
| 7 | 0.335 | 0.128 | 1.19 | 100% | 100% | 73% | 57% | 42% | 8% | 17% |
| 8 | 0.085 | 0.128 | 4.69 | 100% | 100% | 50% | 42% | 27% | 17% | 8% |
| 9 | 0.085 | 0.503 | 1.19 | 100% | 100% | 72% | 74% | 71% | 42% | 39% |
| 10 | 0.165 | 0.248 | 2.31 | 100% | 100% | 78% | 73% | 60% | 42% | 44% |
| 11 | 0.5 | 0.65 | 1 | 100% | 100% | 82% | 75% | 66% | 53% | 44% |
| 12 | 0.5 | 0.65 | 5 | 100% | 100% | 92% | 91% | 84% | 42% | 50% |
| | | | | Chickweed | | | | | | |
| 1 | 0.25 | 0.355 | 7 | 100% | 100% | 100% | 100% | 100% | 100% | 100% |
| 2 | 0.25 | 0.75 | 2 | 100% | 100% | 100% | 100% | 100% | 100% | 100% |
| 3 | 0.5 | 0.355 | 2 | 100% | 99% | 100% | 100% | 100% | 100% | 98% |
| 4 | 0.25 | 0.375 | 3.5 | 100% | 99% | 100% | 99% | 99% | 99% | 96% |
| 5 | 0.25 | 0.375 | 2 | 100% | 100% | 100% | 100% | 100% | 100% | 96% |
| 6 | 0.25 | 0.355 | 3.5 | 100% | 100% | 100% | 100% | 100% | 99% | 90% |
| 7 | 0.335 | 0.128 | 1.19 | 100% | 100% | 100% | 100% | 100% | 100% | 92% |
| 8 | 0.085 | 0.128 | 4.69 | 100% | 98% | 98% | 97% | 96% | 81% | 79% |
| 9 | 0.085 | 0.503 | 1.19 | 100% | 99% | 99% | 99% | 99% | 99% | 86% |
| 10 | 0.165 | 0.248 | 2.31 | 100% | 100% | 98% | 99% | 99% | 98% | 96% |
| 11 | 0.5 | 0.65 | 1 | 100% | 100% | 100% | 100% | 100% | 100% | 100% |
| 12 | 0.5 | 0.65 | 5 | 100% | 100% | 100% | 100% | 100% | 100% | 98% |
| | | | | Groundsel | | | | | | |
| 1 | 0.25 | 0.355 | 7 | 100% | 100% | 92% | 91% | 85% | | |
| 2 | 0.25 | 0.75 | 2 | 96% | 100% | 73% | 72% | 63% | | |
| 3 | 0.5 | 0.355 | 2 | 92% | 100% | 84% | 80% | 71% | | |
| 4 | 0.25 | 0.375 | 3.5 | 96% | 100% | 73% | 72% | 58% | | |
| 5 | 0.25 | 0.375 | 2 | 96% | 100% | 81% | 79% | 72% | | |
| 6 | 0.25 | 0.355 | 3.5 | 92% | 100% | 76% | 78% | 68% | | |
| 7 | 0.335 | 0.128 | 1.19 | 100% | 100% | 59% | 66% | 54% | | |
| 8 | 0.085 | 0.128 | 4.69 | 81% | 100% | 42% | 43% | 27% | | |
| 9 | 0.085 | 0.503 | 1.19 | 100% | 100% | 56% | 47% | 43% | | |
| 10 | 0.165 | 0.248 | 2.31 | 88% | 100% | 67% | 66% | 54% | | |
| 11 | 0.5 | 0.65 | 1 | 100% | 100% | 82% | 83% | 76% | | |
| 12 | 0.5 | 0.65 | 5 | 100% | 100% | 84% | 80% | 74% | | |
| | | | | Hairy Bittercress | | | | | | |
| 1 | 0.25 | 0.355 | 7 | 100% | 100% | 100% | 97% | 100% | 100% | |
| 2 | 0.25 | 0.75 | 2 | 100% | 100% | 100% | 100% | 100% | 99% | |
| 3 | 0.5 | 0.355 | 2 | 100% | 100% | 100% | 100% | 100% | 100% | |
| 4 | 0.25 | 0.375 | 3.5 | 100% | 100% | 100% | 100% | 100% | 99% | |
| 5 | 0.25 | 0.375 | 2 | 100% | 100% | 100% | 97% | 100% | 99% | |
| 6 | 0.25 | 0.355 | 3.5 | 100% | 100% | 100% | 100% | 100% | 97% | |
| 7 | 0.335 | 0.128 | 1.19 | 100% | 100% | 100% | 100% | 100% | 97% | |
| 8 | 0.085 | 0.128 | 4.69 | 100% | 100% | 100% | 100% | 100% | 86% | |
| 9 | 0.085 | 0.503 | 1.19 | 100% | 100% | 95% | 94% | 94% | 75% | |
| 10 | 0.165 | 0.248 | 2.31 | 100% | 100% | 97% | 100% | 100% | 99% | |
| 11 | 0.5 | 0.65 | 1 | 100% | 100% | 100% | 100% | 100% | 100% | |
| 12 | 0.5 | 0.65 | 5 | 100% | 100% | 100% | 100% | 100% | 100% | |
| | | | | White Clover | | | | | | |
| 1 | 0.25 | 0.355 | 7 | 100% | 100% | 81% | 77% | 95% | 98% | 95% |
| 2 | 0.25 | 0.75 | 2 | 100% | 100% | 71% | 77% | 84% | 86% | 69% |
| 3 | 0.5 | 0.355 | 2 | 100% | 100% | 70% | 80% | 86% | 88% | 90% |
| 4 | 0.25 | 0.375 | 3.5 | 100% | 100% | 67% | 83% | 85% | 89% | 90% |
| 5 | 0.25 | 0.375 | 2 | 100% | 100% | 69% | 63% | 84% | 83% | 63% |
| 6 | 0.25 | 0.355 | 3.5 | 100% | 100% | 64% | 67% | 89% | 91% | 82% |
| 7 | 0.335 | 0.128 | 1.19 | 100% | 100% | 80% | 77% | 92% | 91% | 80% |
| 8 | 0.085 | 0.128 | 4.69 | 100% | 100% | 51% | 37% | 73% | 72% | 40% |

TABLE 3-continued

Percentage Control of Weed Seed Germination. Treatments and related formulation information are given on the left. Degree of control over the 90 day period is given where available. The figures represent percent control for all locations. Groundsel screening was terminated at flowering and Hairy Bittercress screening was terminated at plant senescence.

| | Formula Component % | | | Days After Treatment | | | | | | |
|---|---|---|---|---|---|---|---|---|---|---|
| Trt. | Isox. | Prod. | Surf. | 3 | 7 | 14 | 21 | 28 | 60 | 90 |
| 9 | 0.085 | 0.503 | 1.19 | 100% | 100% | 41% | 33% | 73% | 73% | 43% |
| 10 | 0.165 | 0.248 | 2.31 | 100% | 100% | 44% | 70% | 75% | 76% | 48% |
| 11 | 0.5 | 0.65 | 1 | 100% | 100% | 74% | 70% | 91% | 90% | 77% |
| 12 | 0.5 | 0.65 | 5 | 100% | 100% | 79% | 83% | 94% | 94% | 88% |
| | | | | | | Canada Horseweed | | | | |
| 1 | 0.25 | 0.355 | 7 | 100% | 100% | 100% | 100% | 96% | 98% | 97% |
| 2 | 0.25 | 0.75 | 2 | 100% | 100% | 100% | 100% | 96% | 95% | 95% |
| 3 | 0.5 | 0.355 | 2 | 100% | 100% | 100% | 100% | 100% | 95% | 87% |
| 4 | 0.25 | 0.375 | 3.5 | 100% | 100% | 100% | 100% | 100% | 84% | 82% |
| 5 | 0.25 | 0.375 | 2 | 100% | 100% | 100% | 100% | 100% | 91% | 87% |
| 6 | 0.25 | 0.355 | 3.5 | 100% | 100% | 100% | 100% | 96% | 95% | 95% |
| 7 | 0.335 | 0.128 | 1.19 | 100% | 100% | 100% | 100% | 96% | 91% | 90% |
| 8 | 0.085 | 0.128 | 4.69 | 100% | 100% | 90% | 100% | 87% | 74% | 74% |
| 9 | 0.085 | 0.503 | 1.19 | 100% | 100% | 100% | 94% | 91% | 74% | 72% |
| 10 | 0.165 | 0.248 | 2.31 | 100% | 100% | 80% | 100% | 100% | 88% | 90% |
| 11 | 0.5 | 0.65 | 1 | 100% | 100% | 100% | 100% | 100% | 93% | 92% |
| 12 | 0.5 | 0.65 | 5 | 100% | 100% | 100% | 100% | 100% | 95% | 92% |
| | | | | | | Crabgrass | | | | |
| 1 | 0.25 | 0.355 | 7 | 100% | 100% | 98% | 99% | 98% | 99% | 73% |
| 2 | 0.25 | 0.75 | 2 | 100% | 100% | 98% | 100% | 99% | 100% | 80% |
| 3 | 0.5 | 0.355 | 2 | 100% | 100% | 95% | 96% | 92% | 85% | 47% |
| 4 | 0.25 | 0.375 | 3.5 | 100% | 100% | 94% | 97% | 97% | 93% | 80% |
| 5 | 0.25 | 0.375 | 2 | 100% | 100% | 96% | 96% | 97% | 99% | 80% |
| 6 | 0.25 | 0.355 | 3.5 | 100% | 100% | 96% | 96% | 88% | 92% | 60% |
| 7 | 0.335 | 0.128 | 1.19 | 100% | 100% | 73% | 73% | 72% | 20% | 13% |
| 8 | 0.085 | 0.128 | 4.69 | 100% | 100% | 74% | 80% | 78% | 32% | 7% |
| 9 | 0.085 | 0.503 | 1.19 | 100% | 100% | 85% | 95% | 97% | 93% | 66% |
| 10 | 0.165 | 0.248 | 2.31 | 100% | 100% | 95% | 93% | 90% | 66% | 39% |
| 11 | 0.5 | 0.65 | 1 | 100% | 100% | 93% | 95% | 96% | 92% | 67% |
| 12 | 0.5 | 0.65 | 5 | 100% | 100% | 99% | 99% | 98% | 99% | 93% |

Table 3 demonstrates that compositions comprising isoxaben and prodiamine in reduced amounts of active ingredient can result in equal or greater herbicidal control as compared to a composition comprising isoxaben and prodiamine with double the active ingredient.

A composition comprising 0.25% isoxaben and 0.355% prodiamine, as well as 7.0% of 2-ethyl hexanol EO-PO nonionic surfactant, resulted in equal or greater herbicidal control as compared to a composition comprising 0.5% isoxaben and 0.65% prodiamine (double the amount of isoxaben and prodiamine), as well as 5.0% alcohol ethoxylate.

Example 3

The formulations of Table 2 were tested for potential phytotoxicity against herbicide sensitive species Sedum "Autumn Joy". Plants were rated on a 5 to 1 quality scale with 5 being a top quality plant and 1 being a dead plant.

TABLE 4

Sedum 'Autumn Joy' Phytotoxicity Ratings. Plants were evaluated at the end of the growing period.

| | Formula Component % | | | |
|---|---|---|---|---|
| Trt. | Isoxaben | Prodiamine | Surfactant | Rating |
| 1 | 0.25 | 0.355 | 7 | 5.00 |
| 2 | 0.25 | 0.75 | 2 | 4.00 |
| 3 | 0.5 | 0.355 | 2 | 5.00 |
| 4 | 0.25 | 0.375 | 3.5 | 4.00 |
| 5 | 0.25 | 0.375 | 2 | 4.00 |
| 6 | 0.25 | 0.355 | 3.5 | 5.00 |
| 7 | 0.335 | 0.128 | 1.19 | 3.80 |
| 8 | 0.085 | 0.128 | 4.69 | 4.00 |
| 9 | 0.085 | 0.503 | 1.19 | 4.50 |
| 10 | 0.165 | 0.248 | 2.31 | 4.80 |
| 11 | 0.5 | 0.65 | 1 | 4.00 |
| 12 | 0.5 | 0.65 | 5 | 2.00 |

The results in Table 4 demonstrate that a composition comprising isoxaben and prodiamine with a reduced amount of active ingredient can result in a higher plant quality rating (i.e., lower phytotoxicity) than a plant with a higher amount of active ingredient.

Not only does a reduced amount of active ingredient result in lower phytotoxicity, but comparing formulation 11 to formulation 12 demonstrates that increasing a surfactant percentage dramatically reduces the plant quality. The plant quality of, for example, formulation 1 is surprisingly high, given that the active ingredient has been reduced and the surfactant percentage is comparatively high. Additionally, doubling the surfactant percentage (comparing formulation 1 to formulation 6), did not result in a reduced plant quality, but, instead, increased the plant quality.

A composition comprising 0.25% isoxaben and 0.355% prodiamine, as well as 7.0 of 2-ethyl hexanol EO-PO nonionic surfactant, resulted in less or equal phytotoxicity as compared to a composition comprising 0.5% isoxaben and 0.65% prodiamine (double the amount of isoxaben and prodiamine), as well as 5.0% alcohol ethoxylate.

Example 4

Several formulations were made to compare the phytotoxicity of compositions comprising various pre-emergent herbicidal compositions. Seven formulations were prepared according to Table 5. Formulations D, E, and F were prepared with 2-ethyl hexanol EO-PO in an amount of 7% of the weight of the composition.

The phytotoxicity of the formulations was tested in at least two locations. Standard soilless nursery substrates and irrigation practices were used. The trials were designed as randomized complete block trials with five blocks and three replicates.

TABLE 5

Formulas of Treatments

| Treatments | Active Ingredients | % AI | gAI · 1000 ft$^2$ |
|---|---|---|---|
| A | Trifluralin | 2.00 | 20.9 |
|   | Isoxaben | 0.5 | 5.2 |
| B | Dimethenamid | 0.75 | 7.8 |
|   | Pendimethalin | 1.00 | 10.4 |
| C | Oxyfluorfen | 2.00 | 20.9 |
|   | Pendimethalin | 1.00 | 10.4 |
| D | Isoxaben | 0.25 | 2.6 |
|   | Prodiamine | 0.4 | 4.2 |
| E | Isoxaben | 0.25 | 5.2 |
|   | Prodiamine | 0.4 | 8.3 |
| F | Isoxaben | 0.25 | 10.4 |
|   | Prodiamine | 0.4 | 16.7 |
| G | Untreated | 0.0 | 0.0 |

The formulations of Table 5 were applied to the plant species, and the phytotoxicity was measured as shown in Table 6.

TABLE 6

Phytotoxicity of the Formulations of Table 4. The values are percent of the plant showing a phytotoxic response.

| | Days After Treatment | | | | | | |
|---|---|---|---|---|---|---|---|
| Trt. | 7 | 16 | 28 | 41 | 56 | 75 | 86 |
| *Aster* 'Woods Pink' | | | | | | | |
| A | 0 | 0 | 0 | 0 | 0 | 0 | 0 |
| B | 2.5 | 37.5 | 42.5 | 30 | 32.5 | 17.5 | 15 |
| C | — | — | — | — | — | — | — |
| D | 0 | 0 | 5 | 0 | 2.5 | 0 | 0 |
| E | 2.5 | 0 | 0 | 0 | 5 | 5 | 0 |
| F | 0 | 5 | 2.5 | 0 | 5 | 5 | 2.5 |
| G | 0 | 0 | 0 | 0 | 0 | 0 | 0 |

| | Days After Treatment | | | | | | |
|---|---|---|---|---|---|---|---|
| Trt. | 7 | 14 | 28 | 41 | 57 | 77 | 83 | 99 |
| *Loroptalum* 'Chinense Ruby' | | | | | | | | |
| A | 0 | 0 | 10 | 2.5 | 2.5 | 0 | 0 | 0 |
| B | 0 | 0 | 7.5 | 7.5 | 15 | 0 | 12.5 | 17.5 | 22.5 |

TABLE 6-continued

Phytotoxicity of the Formulations of Table 4. The values are percent of the plant showing a phytotoxic response.

| C | 0 | 0 | 10 | 2.5 | 5 | 0 | 5 | 0 |
| D | 0 | 0 | 5 | 2.5 | 2.5 | 0 | 2.5 | 0 |
| E | 0 | 0 | 2.5 | 2.5 | 0 | 0 | 2.5 | 0 |
| F | 0 | 0 | 5 | 5 | 5 | 0 | 5 | 5 |
| G | 0 | 0 | 0 | 0 | 0 | 0 | 0 | 0 |

*Abelia* 'Edward Goucher'

| A | 0 | 0 | 0 | 2.5 | 2.5 | 0 | 5 | 5 |
| B | 0 | 0 | 0 | 5 | 12.5 | 10 | 17.5 | 15 |
| C | 0 | 0 | 0 | 2.5 | 2.5 | 0 | 0 | 0 |
| D | 0 | 0 | 0 | 7.5 | 2.5 | 0 | 5 | 5 |
| E | 0 | 0 | 0 | 2.5 | 5 | 0 | 0 | 0 |
| F | 0 | 0 | 0 | 5 | 5 | 0 | 2.5 | 5 |
| G | 0 | 0 | 0 | 0 | 0 | 0 | 0 | 0 |

| | Days After Treatment | | | |
|---|---|---|---|---|
| Trt | 14 | 30 | 60 | 86 |
| *Hibiscus* 'White Wing' | | | | |
| A | — | — | — | — |
| B | 0 | 0 | 22.5 | 11.7 |
| C | — | — | — | — |
| D | 0 | 0 | 0 | 0 |
| E | 0 | 0 | 0 | 0 |
| F | 0 | 0 | 0 | 7.5 |
| G | 0 | 0 | 0 | 0 |

The results in Table 6 demonstrate that a composition comprising isoxaben and prodiamine with a reduced amount of active ingredient can result in a lower phytotoxicity percentage than a plant with a higher amount of active ingredient.

The plant quality of, for example, formulation D is surprisingly high, given that the active ingredient has been reduced as compared to that of formulations A-C. Additionally, the phytotoxicity percentage of formulations D, E, and F, which contained equal amounts of isoxaben and prodiamine applied at 1, 2, and 4× strength, respectively, showed little difference in the phytotoxic response in the plants.

Example 5

Several formulations of 0.65% prodiamine and 0.5% isoxaben were made with various surfactants, and applied to pineapple weed, sticky chickweed, large crabgrass, and common purselane. The percentage of control for each formulation after 60 days of treatment is described in Table 7.

TABLE 7

| No. | Surfactant (1%) | Pineapple Weed | Sticky Chickweed | Large Crabgrass | Common Purselane |
|---|---|---|---|---|---|
| 1 | 2-Ethyl hexanol EO-PO nonionic surfactant | — | 100% | 97% | 99.5% |
| 2 | Alcohol ethoxylate 12 mol | 84% | 95% | 96% | 96% |
| 3 | Alcohol ethoxylate 7 mol | 90% | 100% | 99% | 100% |
| 4 | None | 75% | 94% | 95% | 83% |

The results in Table 7 demonstrate that a composition comprising 0.65% prodiamine, 0.5% isoxaben, and a surfactant of 2-ethyl hexanol EO-PO, alcohol ethoxylate 12 mol, or alcohol ethoxylate 7 mol has a better herbicidal control level than a composition comprising 0.65% prodiamine, 0.5% isoxaben, and no surfactant.

The invention claimed is:

1. A granular composition comprising:
   about 0.15-0.3 percent (%) isoxaben,
   about 0.3-0.4 percent (%) prodiamine,
   about 2.0-12.0 percent (%) 2-ethyl hexanol EO-PO nonionic surfactant, and
   about 80-95 percent (%) agglomerated cellulosic fibers.

2. A granular composition comprising:
   isoxaben in an amount of about 0.1 to about 0.45 percent (%) by weight of the composition,
   prodiamine in an amount of about 0.125 to about 0.375 percent (%) by weight of the composition,
   2-ethyl hexanol ethylene oxide-propylene oxide (EO-PO) nonionic surfactant in an amount of about 2.0 to about 12.0 percent (%) by weight of the composition, and
   a granular carrier consisting essentially of agglomerated cellulosic fibers, dolomitic limestone, wood dust based chemical carriers, wood fiber granules, crushed corn cob, crushed peanut shells, or mixtures thereof.

3. A method of treating weeds comprising applying the composition of claim 1 to the weeds.

4. A method of treating weeds comprising applying the composition of claim 2 to the weeds.

5. The method of claim 3, wherein the weeds are annual bluegrass, bittercress, Canada horseweed, chickweed, crabgrass, foxtail, goosegrass, groundsel, hairy bittercress, henbit, oxalis, spurge, white clover, or combinations thereof.

6. The method of claim 4, wherein the weeds are annual bluegrass, bittercress, Canada horseweed, chickweed, crabgrass, foxtail, goosegrass, groundsel, hairy bittercress, henbit, oxalis, spurge, white clover, or combinations thereof.

* * * * *